US012568324B2

(12) United States Patent
Stankovic

(10) Patent No.: US 12,568,324 B2
(45) Date of Patent: Mar. 3, 2026

(54) HEADSET

(71) Applicant: GN Audio A/S, Ballerup (DK)

(72) Inventor: Boris Stankovic, Ballerup (DK)

(73) Assignee: GN AUDIO A/S, Ballerup (DK)

( * ) Notice: Subject to any disclaimer, the term of this patent is extended or adjusted under 35 U.S.C. 154(b) by 172 days.

(21) Appl. No.: 18/496,200

(22) Filed: Oct. 27, 2023

(65) Prior Publication Data

US 2024/0187772 A1 Jun. 6, 2024

(30) Foreign Application Priority Data

Dec. 2, 2022 (EP) .................................... 22211054

(51) Int. Cl.
*H04R 1/10* (2006.01)

(52) U.S. Cl.
CPC ......... *H04R 1/1008* (2013.01); *H04R 1/1041* (2013.01)

(58) Field of Classification Search
CPC ............................ H04R 1/1008; H04R 1/1041
See application file for complete search history.

(56) References Cited

U.S. PATENT DOCUMENTS

| | | | | |
|---|---|---|---|---|
| 10,484,793 | B1 * | 11/2019 | Peterson | H04R 3/12 |
| 11,109,135 | B1 * | 8/2021 | Corona Aparicio | H04R 1/1066 |
| 11,184,696 | B1 * | 11/2021 | Li | H01Q 13/10 |
| 2014/0064500 | A1 | 3/2014 | Lee | |
| 2014/0146982 | A1 | 5/2014 | Pelosi | |
| 2016/0205459 | A1 | 7/2016 | Kamada et al. | |
| 2016/0353194 | A1 | 12/2016 | Stevens | |
| 2023/0164488 | A1 * | 5/2023 | Degner | H04R 1/1008 381/374 |

FOREIGN PATENT DOCUMENTS

| | | | |
|---|---|---|---|
| WO | 20201341 | A1 | 10/2020 |

OTHER PUBLICATIONS

The extended European search report issued in European Application No. 22211054.6, dated Aug. 24, 2023.
The partial European search report issued in European Application No. 22211054.6, dated May 24, 2023.

* cited by examiner

*Primary Examiner* — Suhan Ni
(74) *Attorney, Agent, or Firm* — HSML P.C.

(57) ABSTRACT

A headset comprising a first earcup comprising a first capacitive sensor a second earcup comprising a second capacitive sensor, and a headband comprising a third capacitive sensor. A processor of the headset being configured to receive capacitive information from the first capacitive sensor, the second capacitive sensor, and the third capacitive sensor, to determine whether the first capacitive sensor, the second capacitive sensor, and the third capacitive sensor are capacitively coupled to a user wearing the headset based on the received capacitive information, and to set the headset to a first active mode, if the first capacitive sensor, the second capacitive sensor, and the third capacitive sensor are determined to be capacitively coupled to the user wearing the headset.

15 Claims, 2 Drawing Sheets

HEADSET

This application claims priority to European Patent Application No. 22211054.6, titled "HEADSET", filed on Dec. 2, 2022, which is hereby incorporated by reference in its entirety.

The present disclosure relates to a headset with three capacitive sensors for detecting a whether a headset is on-head or off-head.

BACKGROUND

Power consumption and methods for lowering power consumption in headsets continues to be a vital aspect when designing headsets. Presently, a plethora of solutions have been created for solving problems relating to power consumption, be it improving battery characteristics, lowering power consumption of headset components, or methods for on-head detection.

On-head detection helps in improving power consumption by controlling one or more configurations of the headset in response to determining whether the headset is on-head or off-head. For example, the headset may pause audio being played by the headset when the headset is determined to be off-head, and resume playing the audio when the headset is determined to be on-head, thus, lowering the power consumption.

A variety of solutions for on-head detection for headsets have been developed and are well described within the prior art. These solutions may be of a capacitive, acoustic, or optic nature.

An example of an on-head detection solution is described in WO20201341 A1 which discloses a method of determining whether a hearing device is on-head or off-head, where the hearing device comprises at least a first capacitive proximity sensor. The sensor is adapted to detect a first capacitive load C, which varies depending on the proximity of the head or ear of a user. The sensor compensates for drift during use, whereby a reliable on-head detection is obtained.

However, there is still room for improvement in on-head detection solutions.

SUMMARY

It is an object of the present disclosure to provide an improved headset which overcomes or at least alleviates the problems of the prior art. These and other objects of the disclosure are achieved by the disclosure defined in the independent claims and explained in the following description. Further objects of the disclosure are achieved by embodiments defined in the dependent claims and in the detailed description of the disclosure.

According to a first aspect of the disclosure there is provided a headset comprising:

- a first earcup comprising a first support structure, a first cushion, and a first capacitive sensor configured for capacitively coupling to a user wearing the headset,
- a second earcup comprising a second support structure, a second cushion, and a second capacitive sensor configured for capacitively coupling to the user wearing the headset,
- a headband connecting the first earcup and the second earcup and comprising a third capacitive sensor configured for capacitively coupling to the user wearing the headset,

- a processor communicatively connected to the first capacitive sensor, the second capacitive sensor, and the third capacitive sensor, and configured to:
  - receive capacitive information from the first capacitive sensor, the second capacitive sensor, and the third capacitive sensor,
  - determine for each of the first capacitive sensor, the second capacitive sensor, and the third capacitive sensor whether the first capacitive sensor, the second capacitive sensor, and the third capacitive sensor are capacitively coupled to the user wearing the headset based on the received capacitive information, and
  - if the first capacitive sensor, the second capacitive sensor, and the third capacitive sensor are determined to be capacitively coupled to the user wearing the headset, set the headset to a first active mode.

Consequently, an improved headset is provided. The presented headset has an improved method for detecting whether the headset is worn or not worn by a user. By requiring three different capacitive sensors to be capacitively coupled to the user it minimizes the risk of false positives occurring because of one or two of the capacitive sensors being capacitively coupled to the user, e.g., if a user of the headset grabs the headset, the risk that the capacitive sensors capacitively couples to the fingers of the user and results in a wrongful on-head determination is minimized.

The first earcup may be configured for being worn over the ear of a user of the headset. The first earcup may be configured for being worn on the ear of a user of the headset. The second earcup may be substantially identical to the first earcup. The first earcup and the second earcup may comprise corresponding components. The first earcup and the second earcup may differ from each other, e.g., the first earcup may comprise the processor while electric components of the second earcup are communicatively connected to the processor comprised by the first earcup. In one embodiment the first earcup or the second earcup may comprise a boom arm for picking up a voice of the user of the headband. The first earcup and/or the second earcup may comprise one or more input transducers such as one or more microphones. The first earcup and/or the second earcup may comprise one or more output transducers such as one or more loudspeakers.

The first support structure may comprise a polymer material, a metal material, or a combination of these. The first support structure may be formed from a polymer material, a metal material, or a combination of these. The second support structure may be substantially identical to the first support structure. The first support structure and the second support structure may comprise corresponding components. The first support structure and the second support structure may differ from each other The first support structure and the second support structure are connected to the headband of the headset. The first support structure and the second support structure may each form a housing configured to house one or more electrical components and/or one or more transducers, such as a processor, one or more input transducers, and one or more output transducers.

The first cushion and/or the second cushion may each comprise a foam structure or other soft structure for abutting against a head of the user of the headset, while the headset is worn. The first cushion may be mechanically connected and/or adhesively connected to the first support structure. The second cushion may be mechanically connected and/or adhesively connected to the second support structure. The first cushion and/or the second cushion may comprise one or more sensors and/or one or more electrical components. The first cushion and/or the second cushion may comprise one or more sensors and/or one or more electrical components embedded in the respective cushion.

The headband connects the first earcup with the second earcup. The headband may comprise a polymer material, a metal material, or a combination of these. The headband may be formed from a polymer material, a metal material, or a combination of these. The headband may comprise a head band cushion for abutting against a head of the user of the headset, while the headset is worn. The headband may comprise one or more wires electrically connecting components of the first earcup with components of the second earcup.

The first capacitive sensor, the second capacitive sensor, and the third capacitive sensor are configured to capacitively couple to a user wearing the headset. The first capacitive sensor, the second capacitive sensor, and the third capacitive sensor are configured to obtain capacitive information. The first capacitive sensor, the second capacitive sensor, and the third capacitive sensor may be configured to obtain capacitive information by measuring a change in mutual capacitance or self-capacitance. The first capacitive sensor, the second capacitive sensor, and the third capacitive sensor may be provided as self-capacitance sensors, mutual capacitance sensors, or hybrid sensors capable of measuring as both self-capacitance sensors and mutual capacitance sensors. The first capacitive sensor, the second capacitive sensor, and the third capacitive sensor may be configured to capacitively couple to the skin of the user wearing the headset.

By stating the first capacitive sensor, the second capacitive sensor, and the third capacitive sensor are configured to capacitively couple to a user wearing the headset, it is meant the first capacitive sensor, the second capacitive sensor, and the third capacitive sensor are configured to obtain capacitive information within a measurement range allowing for detecting whether the capacitive sensors are capacitively coupled to the skin of a user wearing the headset. Having the first capacitive sensor, the second capacitive sensor, and the third capacitive sensor are configured to capacitively couple to a user wearing the headset may comprise arranging the first capacitive sensor, the second capacitive sensor, and the third capacitive sensor at an outer surface of the headset to allow the sensor to capacitively couple to the user of the headset.

The capacitive information obtained by the first capacitive sensor, the second capacitive sensor, and the third capacitive sensor may be transmitted to an analogue to digital converter to convert the capacitive information into a digital electrical signal which may be further processed by the processor.

The first capacitive sensor may be embedded in the first cushion or the first support structure. The first capacitive sensor may be adhesively or mechanically connected to the first cushion or the first support structure. The second capacitive sensor may be embedded in the second cushion or the second support structure. The first capacitive sensor may be adhesively or mechanically connected to the first cushion or the first support structure.

The third capacitive sensor may be embedded in the headband. The third capacitive sensor may be mechanically or adhesively connected to the headband. In an embodiment, the headband comprises a headband cushion and the third capacitive sensor is embedded in the headband cushion. In an embodiment, the headband comprises a headband cushion and the third capacitive sensor is mechanically or adhesively connected to the headband cushion.

The first capacitive sensor, the second capacitive sensor, and the third capacitive sensor may be communicatively connected to the processor via one or more electrically conductive wires. The first capacitive sensor, the second capacitive sensor, and the third capacitive sensor may be wirelessly communicatively connected to the processor, wherein the first capacitive sensor, the second capacitive sensor, and the third capacitive sensor each comprises a transmitter for transmitting capacitive information to the processor. The first capacitive sensor, the second capacitive sensor, and the third capacitive sensor may each comprise a receiver or a transceiver to allow for the first capacitive sensor, the second capacitive sensor, and the third capacitive sensor to receive signals from the processor, e.g., control signals to control a measuring mode of the first capacitive sensor, the second capacitive sensor, and the third capacitive sensor. The measuring mode may for example control whether the first capacitive sensor, the second capacitive sensor, and the third capacitive sensor measures as self-capacitance sensors, mutual-capacitance sensors, or hybrid capacitance sensors, i.e., as self-capacitance sensors and mutual-capacitance sensors concurrently.

By capacitive information may be understood one or more values for capacitance, e.g., having a time series where each period is associated with a measured capacitive value. The capacitive information may be comprised in a capacitive signal, where the capacitive information is the payload of the capacitive signal. Each of the first capacitive sensor, the second capacitive sensor, and the third capacitive sensor may be configured to generate a capacitive signal with each of their obtained capacitive information and transmit the capacitive signal to the processor.

The processor may receive capacitive information from the first capacitive sensor, the second capacitive sensor, and the third capacitive sensor via a wired connection or a wireless connection. The processor may receive capacitive information from the first capacitive sensor, the second capacitive sensor, and the third capacitive sensor via an interface communicatively connected to the processor. The processor may receive capacitive information from each of the first capacitive sensor, the second capacitive sensor, and the third capacitive sensor, and process the capacitive information from each of the first capacitive sensor, the second capacitive sensor, and the third capacitive sensor separately.

The processor may determine whether the first capacitive sensor, the second capacitive sensor, and the third capacitive sensor are capacitively coupled to the user wearing the headset by comparing the capacitive information received from the first capacitive sensor, the second capacitive sensor, and the third capacitive sensor to one or more thresholds, e.g., if capacitive information from the first capacitive sensor exceeds the threshold it may be determined to be capacitively coupled to the user wearing the headset, and if capacitive information from the second capacitive sensor the third capacitive sensors does not exceed the threshold they may be determined to not be capacitively coupled to the user wearing the headset. The threshold may be a fixed value for the capacitance, or it may be given as a threshold for a change in capacitance measured over time.

The processor may be configured to determine a present mode of operation the headset is in, e.g., the processor may be configured to determine whether the headset is in the first active mode by determining the last mode the headset was set to. The processor may determine whether the headset is in the first active mode by retrieving mode information from a memory communicatively connected to the processor, wherein mode information is indicative of the mode the headset is in at the time of retrieving the mode information.

The processor may set the headset to the first active mode by generating a mode switch signal and transmitting the mode switch signal to a mode selector block, where the mode selector block may be an electrical component such as a switch, or the mode selector block may be part of an algorithm ran the processor.

The first active mode may be associated with a specific wear style, e.g., in the present disclosure the first active mode is associated with the user of the headset wearing the headset at both of their ears. The first active mode may be associated with one or more playback configurations, e.g., if the headset is connected to an external electronic device streaming music to the headset, and the music being streamed is paused, the first active mode may be configured to start playing the music again. The user of the headset may customize the one or more playback configurations associated with the first active mode to suit their preferences. The first active mode may be associated with one or more controls of the headset, e.g., control of one or more sensors associated with the headset, or communication with external devices.

In one or more example headsets, the headset may comprise an interface. The interface may comprise a wireless transceiver, also denoted as a radio transceiver, and an antenna for wireless transmission and reception of an audio signal, such as for wireless transmission of an output signal and/or wireless reception of a wireless input signal. The headset may be configured for wireless communication with one or more electronic devices, such as another headset, a smartphone, a tablet, a computer and/or a smart watch. The headset optionally comprises an antenna for converting one or more wireless input audio signals to antenna output signal(s). The headset may be configured for wireless communications via a wireless communication system, such as short-range wireless communications systems, such as Wi-Fi, Bluetooth, Zigbee, IEEE 802.11, IEEE 802.15, infrared and/or the like. The headset may be configured for wireless communications via a wireless communication system, such as a 3GPP system, such as a 3GPP system supporting one or more of: New Radio, NR, Narrow-band IoT, NB-IoT, and Long-Term Evolution—enhanced Machine Type Communication, LTE-M, millimeter-wave communications, such as millimeter-wave communications in licensed bands, such as device-to-device millimeter-wave communications in licensed bands. In one or more example headsets the interface of the headset comprises one or more of: a Bluetooth interface, Bluetooth low energy interface, and a magnetic induction interface. For example, the interface of the headset may comprise a Bluetooth antenna and/or a magnetic interference antenna. In one or more example headsets, the interface may comprise a connector for wired communication, via a connector, such as by using an electrical cable. The connector may connect one or more microphones to the headset. The connector may connect the headset to an electronic device, e.g., for wired connection. The one or more interfaces can be or comprise wireless interfaces, such as transmitters and/or receivers, and/or wired interfaces, such as connectors for physical coupling In an embodiment, the headset is configured to be worn by a user. The headset may be arranged at the user's ear, on the user's ear, over the user's ear, in the user's ear, in the user's ear canal, behind the user's ear and/or in the user's concha, i.e., the headset is configured to be worn in, on, over and/or at the user's ear.

The headset may be embodied in various housing styles or form factors. Some of these form factors are, on the ear headphones or over the ear headphones. The person skilled in the art is aware of various kinds of headsets and of different options for arranging the headset in, on, over and/or at the ear of the headset wearer.

In an embodiment, the headset may comprise one or more input transducers. The one or more input transducers may comprise one or more microphones. The one or more input transducers may comprise one or more vibration sensors configured for detecting bone vibration. The one or more input transducer(s) may be configured for converting an acoustic signal into a first electric input signal. The first electric input signal may be an analogue signal. The first electric input signal may be a digital signal. The one or more input transducer(s) may be coupled to one or more analogue-to-digital converter(s) configured for converting the analogue first input signal into a digital first input signal.

In an embodiment, the headset may comprise one or more antenna(s) configured for wireless communication. The one or more antenna(s) may comprise an electric antenna. The electric antenna may be configured for wireless communication at a first frequency. The first frequency may be above 800 MHZ, preferably a wavelength between 900 MHz and 6 GHz. The first frequency may be 902 MHz to 928 MHz. The first frequency may be 2.4 to 2.5 GHz. The first frequency may be 5.725 GHz to 5.875 GHz. The one or more antenna(s) may comprise a magnetic antenna. The magnetic antenna may comprise a magnetic core. The magnetic antenna may comprise a coil. The coil may be coiled around the magnetic core. The magnetic antenna may be configured for wireless communication at a second frequency. The second frequency may be below 100 MHZ. The second frequency may be between 9 MHz and 15 MHz.

In an embodiment, the headset may comprise one or more wireless communication unit(s). The one or more wireless communication unit(s) may comprise one or more wireless receiver(s), one or more wireless transmitter(s), one or more transmitter-receiver pair(s) and/or one or more transceiver (s). At least one of the one or more wireless communication unit(s) may be coupled to the one or more antenna(s). The wireless communication unit may be configured for converting a wireless signal received by at least one of the one or more antenna(s) into a second electric input signal. The headset may be configured for wired/wireless audio communication, e.g., enabling the user to listen to media, such as music or radio and/or enabling the user to perform phone calls.

In an embodiment, the wireless signal may originate from one or more external source(s) and/or external devices, wireless audio transmitter(s), smart computer(s) and/or distributed microphone array(s) associated with a wireless transmitter. The wireless input signal(s) may origin from another audio device, such as a smartphone and/or a smart watch.

The processor may be configured for processing the first and/or second electric input signal(s). The processing may comprise compensating for a hearing loss of the user, i.e., apply frequency dependent gain to input signals in accordance with the user's frequency dependent hearing impairment. The processing may comprise performing feedback cancelation, echo cancellation, beamforming, tinnitus reduction/masking, noise reduction, noise cancellation, speech recognition, bass adjustment, treble adjustment and/or processing of user input. The processor may be a processor, an integrated circuit, an application, functional module, etc. The processor may be implemented in a signal-processing chip or a printed circuit board (PCB). The processor may be configured to provide a first electric output signal based on the processing of the first and/or second electric input signal(s). The processor may be configured to provide a second electric output signal. The second electric output signal may be based on the processing of the first and/or second electric input signal(s).

In an embodiment, the headset may comprise an output transducer. The output transducer may be coupled to the processor. The output transducer may be a loudspeaker. The output transducer may be configured for converting the first electric output signal into an acoustic output signal. The output transducer may be coupled to the processor via the magnetic antenna.

In an embodiment, the wireless communication unit may be configured for converting the second electric output signal into a wireless output signal. The wireless output signal may comprise synchronization data. The wireless communication unit may be configured for transmitting the wireless output signal via at least one of the one or more antennas.

In an embodiment, the headset may comprise a digital-to-analogue converter configured to convert the first electric output signal, the second electric output signal and/or the wireless output signal into an analogue signal.

In an embodiment, the headset may comprise a power source. The power source may comprise a battery providing a first voltage. The battery may be a rechargeable battery. The battery may be a replaceable battery. The power source may comprise a power management unit. The power management unit may be configured to convert the first voltage into a second voltage. The power source may comprise a charging coil. The charging coil may be provided by the magnetic antenna.

In an embodiment, the headset may comprise a memory, including volatile and non-volatile forms of memory.

The headset may be configured for audio communication, e.g., enabling the user to listen to media, such as music or radio, and/or enabling the user to perform phone calls.

The headset may comprise one or more antennas for radio frequency communication. The one or more antennas may be configured for operation in ISM frequency band. One of the one or more antennas may be an electric antenna. One or the one or more antennas may be a magnetic induction coil antenna. Magnetic induction, or near-field magnetic induction (NFMI), typically provides communication, including transmission of voice, audio, and data, in a range of frequencies between 2 MHz and 15 MHz. At these frequencies, the electromagnetic radiation propagates through and around the human head and body without significant losses in the tissue.

The magnetic induction coil may be configured to operate at a frequency below 100 MHZ, such as at below 30 MHZ, such as below 15 MHZ, during use. The magnetic induction coil may be configured to operate at a frequency range between 1 MHz and 100 MHz, such as between 1 MHz and 15 MHz, such as between 1 MHz and 30 MHz, such as between 5 MHz and 30 MHz, such as between 5 MHz and 15 MHz, such as between 10 MHz and 11 MHZ, such as between 10.2 MHz and 11 MHz. The frequency may further include a range from 2 MHz to 30 MHz, such as from 2 MHz to 10 MHz, such as from 2 MHz to 10 MHz, such as from 5 MHz to 10 MHz, such as from 5 MHz to 7 MHz.

The electric antenna may be configured for operation at a frequency of at least 400 MHZ, such as of at least 800 MHZ, such as of at least 1 GHZ, such as at a frequency between 1.5 GHz and 6 GHZ, such as at a frequency between 1.5 GHz and 3 GHz such as at a frequency of 2.4 GHz. The antenna may be optimized for operation at a frequency of between 400 MHz and 6 GHz, such as between 400 MHz and 1 GHZ, between 800 MHz and 1 GHz, between 800 MHz and 6 GHz, between 800 MHz and 3 GHZ, etc. Thus, the electric antenna may be configured for operation in ISM frequency band. The electric antenna may be any antenna capable of operating at these frequencies, and the electric antenna may be a resonant antenna, such as monopole antenna, such as a dipole antenna, etc. The resonant antenna may have a length of $\lambda/4\pm10\%$ or any multiple thereof, $\lambda$ being the wavelength corresponding to the emitted electromagnetic field.

In an embodiment the processor is configured to, in response to setting the headset in the first active mode, set the headset to a first audio mode associated with one or more audio settings of the headset.

Consequently, when the headset detects the headset is worn in the first active mode it automatically sets the headset to a first audio mode, and thereby automatically changes the one or more audio settings to suit that wear style. The one or more audio settings may comprise one or more playback settings. The audio settings may comprise a listening mode, e.g., a hear-through mode, an active noise cancelling mode, or similar.

The one or more playback setting may comprise pausing media content, changing the gain profile, a mixer setting, a volume setting, changing media content, starting paused media content, etc.

In an embodiment the processor is configured to:

determine whether the headset is in the first active mode, set the headset in a second active mode, if the first capacitive sensor and the third capacitive sensor are determined to be capacitively coupled to the user wearing the headset and the headset is determined to be in the first active mode, or if the second capacitive sensor and the third capacitive sensor are determined to be capacitively coupled to the user wearing the headset and the headset is determined to be in the first active mode.

Consequently, when the user of the headset is only wearing the headset on one ear the headset will detect this, thus, allowing for further customization in response to different wear styles. For example, it is quite common for a person to remove an earcup from their ear, either to participate in a conversation or for removing heat and/or pressure from that ear, the headset according to the present disclosure may detect this and respond to these changes.

The second active mode in the present disclosure is associated with the user of the headset wearing the headset at one ear while the earcup is removed from the other ear. The second active mode may be associated with one or more playback configurations, e.g., if the headset is connected to an external electronic device streaming music to the headset, and the music being streamed is played through both earcups, the second active mode may be configured to start playing the music only through the earcup worn at the ear of the user or lowering the volume being output by the earcup not being worn, hence, allowing a person not to be interrupted by music playing through the earcup not being worn. The user of the headset may customize the one or more playback configurations associated with the second active mode to suit their preferences. The second active mode may be associated with one or more controls of the headset, e.g., control of one or more sensors associated with the headset, or communication with external devices.

In an embodiment the processor is configured to, in response to setting the headset in the second active mode, set an audio setting of the headset to a second audio mode.

Consequently, when the headset detects the headset is worn in the second active mode it automatically sets the headset to a second audio mode, and thereby automatically changes the one or more audio settings to suit that wear style. The one or more audio settings may comprise one or more playback settings. The audio settings may comprise a listening mode, e.g., a hear-through mode, an active noise cancelling mode, or similar.

In an embodiment the processor is configured to determine whether the head is in an active mode, and if the processor determines the third capacitive sensor is determined to not be capacitively coupled to the user wearing the headset and the headset is determined to be in an active mode, set the headset to a passive mode.

Consequently, when the user of the headset has taken off the headset the headset will detect this, thus, allowing for further customization in response to different wear styles.

In the present disclosure, an active mode is to be understood as any active mode where the headset is worn by a user. Both the first active mode and the second active mode may be understood as an active mode.

The passive mode in the present disclosure is associated with the user of the headset not wearing the headset anymore. The passive mode may be associated with one or more playback configurations, e.g., if the headset is connected to an external electronic device streaming music to the headset, setting the headset to the passive move may result in music being streamed being paused, hence, saving power. The user of the headset may customize the one or more playback configurations associated with the passive mode to suit their preferences. The passive mode may be associated with one or more controls of the headset, e.g., control of one or more sensors associated with the headset, or communication with external devices. The passive mode may be associated with one or more controls of the headset, e.g., turning off the headset while in the passive mode.

In an embodiment the processor is configured to, in response to setting the headset in the passive mode, set an audio setting of the headset to a third audio mode.

Consequently, when the headset detects the headset is worn in the passive mode it automatically sets the headset to a third audio mode, and thereby automatically changes the one or more audio settings to suit that wear style. The one or more audio settings may comprise one or more playback settings. The audio settings may comprise a listening mode, e.g., a hear-through mode, an active noise cancelling mode, or similar.

In an embodiment the first capacitive sensor, the second capacitive sensor, and the third capacitive sensor each are configured to measure as self-capacitance sensors.

In an embodiment the first capacitive sensor, the second capacitive sensor, and the third capacitive sensor each are configured to measure as mutual-capacitance sensors.

In an embodiment the first capacitive sensor, the second capacitive sensor, and the third capacitive sensor are configured to measure as mutual-capacitance sensors, wherein the first capacitive sensor and the third capacitive sensor are configured to form a first mutual capacitive sensor, and the second capacitive sensor and the third capacitive sensor are configured to form a second mutual capacitive sensor.

In an embodiment the processor is configured to:

determine whether the headset is in an active mode, if the headset is determined to not be in an active mode, set the first capacitive sensor, the second capacitive sensor, and the third capacitive sensor to measure as self-capacitance sensors, if the headset is determined to be in an active mode, set the first capacitive sensor, the second capacitive sensor, and the third capacitive sensor to measure as mutual capacitance sensors, or set the first capacitive sensor, the second capacitive sensor, and the third capacitive sensor to measure as mutual capacitance sensors and self-capacitance sensors.

Consequently, while the headset is not worn by the user the capacitive sensors are configured to act as self-capacitance sensors, which requires less power, thus, avoiding the sensors draining an unnecessary large amount of power while the headset is not in use. Then when the headset is in use by a user, i.e., the headset being in an active mode, the capacitive sensors may go into a more sensitive measuring mode, which may be more draining on power, but may provide more reliable capacitive information.

The first capacitive sensor, the second capacitive sensor, and the third capacitive sensor may go into a hybrid mode, where they measure both as self-capacitance sensors, and mutual capacitance sensors. Measurement as mutual capacitance sensors may be performed by the capacitance sensors forming mutual capacitance sensors, i.e., the first capacitance sensors and the third capacitance sensor forming a mutual capacitance sensor, and the second capacitance sensors and the third capacitance sensor forming a mutual capacitance sensor. Measurement as mutual capacitance sensors may be performed by the capacitance sensors by the capacitance sensors being provided as mutual capacitance sensors, i.e., each if the first capacitance sensor, the second capacitance sensor and the third capacitance sensor being provided as self-contained mutual capacitance sensors. Each of the first capacitive sensor, the second capacitive sensor, and the third capacitive sensor may be provided as a hybrid sensor, capable of measuring both as a self-capacitance sensor, and a mutual capacitance sensor.

In an embodiment the first earcup comprises a fourth capacitive sensor configured for capacitively coupling to the user wearing the headset, wherein the second earcup comprises a fifth capacitive sensor configured for capacitively coupling to the user wearing the headset, and wherein the processor is communicatively connected to the fourth capacitive sensor and the fifth capacitive sensor, and configured to:

receive capacitive information from the first capacitive sensor, the second capacitive sensor, the third capacitive sensor, the fourth capacitive sensor, and the fifth capacitive sensor, determine whether the first capacitive sensor, the second capacitive sensor, the third capacitive sensor, the fourth capacitive sensor, and the fifth capacitive sensor are capacitively coupled to the user wearing the headset based on the received capacitive information, and if the first capacitive sensor, the second capacitive sensor, the third capacitive, the fourth capacitive sensor, and the fifth capacitive sensor are determined to be capacitively coupled to the user wearing the headset, set the headset to a first active mode.

By requiring five different capacitive sensors to be capacitively coupled to the user it further minimizes the risk of false positives occurring because of one or two of the capacitive sensors being capacitively coupled to the user. Especially, the risk of a false positive caused by a person grabbing the headset is minimized.

In an embodiment the processor is configured to:

determine whether the headset is in the first active mode, set the headset in a second active mode, if the first capacitive sensor, fourth capacitive sensor and the third capacitive sensor are determined to be capacitively coupled to the user wearing the headset and the headset is determined to be in the first active mode, or if the second capacitive sensor, the fifth capacitive sensor and the third capacitive sensor are determined to be capacitively coupled to the user wearing the headset and the headset is determined to be in the first active mode.

In an embodiment the first capacitive sensor is separated from the fourth capacitive sensor with a first distance of 1 cm-5 cm, preferably 1 cm-3 cm, and wherein the second capacitive sensor is separated from the fifth capacitive sensor with a second distance of 1 cm-5 cm, preferably 1 cm-3 cm.

Having the sensors separated from each other by a certain distance, minimizes the risk of both sensors being activated simultaneously by a person grabbing the headset or similar.

In an embodiment the third capacitive sensor is embedded in the headband.

BRIEF DESCRIPTION OF THE DRAWINGS

The above and other features and advantages of the present disclosure will become readily apparent to those skilled in the art by the following detailed description of example embodiments thereof with reference to the attached drawings, in which:

FIG. 2 is a flow diagram of what a processor according to an embodiment of the present disclosure is configured to.

FIG. 3 is a flow diagram of what a processor according to an embodiment of the present disclosure is configured to.

DETAILED DESCRIPTION

Figure 1:
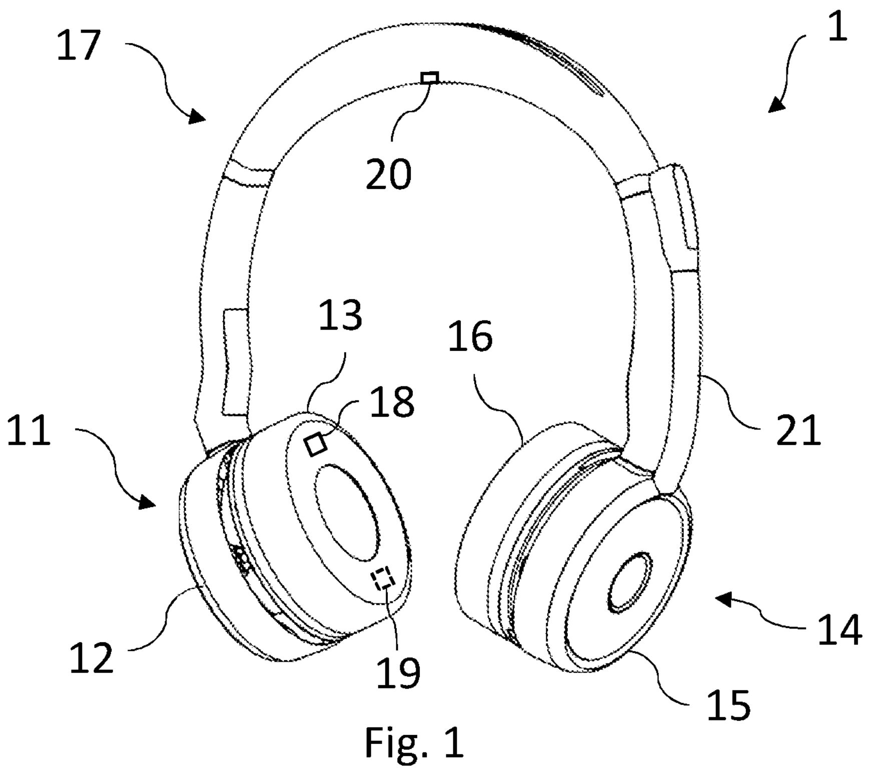
FIG. 1 is a schematic drawing of a headset according to an embodiment of the invention.

Various example embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Referring initially to FIG. 1 showing a schematic drawing of a headset 1 according to an embodiment of the invention. The headset comprises a first earcup 11. The first earcup 11 comprises a first support structure 12, a first cushion 13, and a first capacitive sensor 18. Optionally, the first earcup 11 may further comprise a fourth capacitive sensor 19. In other embodiments, the first earcup 11 may comprise one or more additional capacitive sensors besides the first capacitive sensor 18 and the fourth capacitive sensor 19, making the total number of capacitive sensors comprised in the first earcup 11 three, four, or more. The capacitive sensors 18, 19 are configured for capacitively coupling to a user wearing the headset. The capacitive sensors 18, 19 of the first earcup 11 may be configured to measure as self-capacitance sensors, mutual capacitance sensors, or hybrid sensors capable of measuring both as self-capacitance sensors and mutual capacitance sensors. The capacitive sensors 18, 19 are in the shown embodiment embedded in the cushion 13. In other embodiments, the capacitive sensors 18, 19 may be embedded in or connected to the support structure 12. The capacitive sensors 18, 19 may be arranged near an outer surface of the cushion 13 configured to abut against a user while the headset 1 is worn. The cushion 13 is provided as an on-the-ear cushion 13, i.e., the cushion 13 is configured to abut an ear of a user while the headset 1 is worn by the user of the headset 1. In another embodiment the cushion 13 may be provided as an over-the-ear cushion 13, i.e., the cushion 13 being configured to extend over the ear of a user while the headset 1 is worn by the user of the headset 1. The cushion 13 is connected to a support structure 12, the connection may be facilitated by a mechanical connection, an adhesive, or a combination of these. The support structure 12 is connected to a headband 17. The headband 17 connects the first earcup 11 to a second earcup 14. The second earcup 14 comprises a support structure 15, cushion 16, and one or more capacitive sensors (not shown). The second earcup 14 may be substantially identical to the first earcup 11. In the shown embodiment, the one or more capacitive sensors of the second earcup may be substantially identical to the capacitive sensors 18, 19 of the first earcup 11 and be arranged in a corresponding manner as the capacitive sensors 18, 19 of the first earcup. In the shown embodiment, the second earcup further comprises a boom arm 21. The boom arm 21 is connected to the support structure 15 of the second earcup 14. The first earcup 11 and/or the second earcup 14 may each further comprise one or more input transducers (not shown), and/or one or more output transducers (not shown). The first earcup 11 and/or the second earcup 14 comprises a processor (not shown). The processor is communicatively connected to the first capacitive sensor, the second capacitive sensor, and the third capacitive sensor. The headband 17 connecting the first earcup 11 and the second earcup 14 comprises a third capacitive sensor 20 configured for capacitively coupling to the user wearing the headset. The third capacitive sensor 20 is embedded in the headband 17.

The first capacitive sensor 18 may be configured to form a first mutual capacitive sensor together with the third capacitive sensor 20, e.g., by having either of the first capacitive sensor 18 and the third capacitive sensor acting as a receiver electrode and having the other capacitive sensor acting as a transmitter electrode. A similar configuration may be formed between the third capacitive sensor 20 and the one or more capacitive sensors of the second earcup 14. Preferably, the capacitive sensors 18, 19 of the earcups 11, 14 are arranged a distance from each other, e.g., the first capacitive sensor being separated from the fourth capacitive sensor with a first distance of 1 cm-5 cm, preferably 1 cm-3 cm, and in the case where the second earcup 14 also comprises two capacitive sensors these may take on a similar configuration, I.e., being separated by first distance of 1 cm-5 cm, preferably 1 cm-3 cm.

Figure 2:
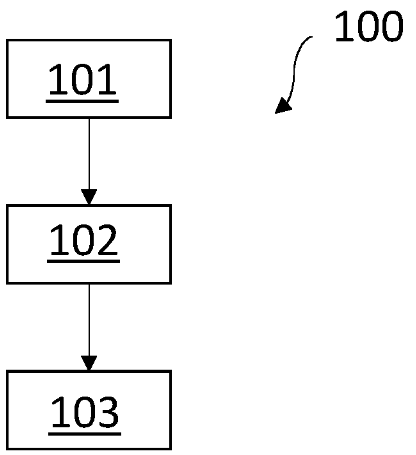

Referring to FIG. 2 showing a flow diagram 100 of what a processor according to an embodiment of the present disclosure is configured to. In a first step 101 the processor receives capacitive information from the first capacitive sensor, the second capacitive sensor, and the third capacitive sensor. The capacitive information may be received via a wireless connected or a wired connection. The capacitive information may be received via an interface communicatively connected to the capacitive sensors and the processor. Capacitive information may be received from each of the first capacitive sensor, the second capacitive sensor, and the third capacitive sensor. In a second step 102 the processor determines for each of the first capacitive sensor, the second capacitive sensor, and the third capacitive sensor whether the first capacitive sensor, the second capacitive sensor, and the third capacitive sensor are capacitively coupled to the user wearing the headset based on the received capacitive information. The determination may be made by comparing the received capacitive information from the capacitive sensors to one or more capacitive threshold values. Each of the capacitive sensors may have different capacitive threshold values associated with them to determine whether the capacitive sensor is capacitively coupled to the skin of a user wearing the headset, e.g., the capacitive sensor comprised by the headband may have a different capacitive threshold value associated with it than the capacitive sensors comprised by the earcups. The second step 102 may comprise determining for each of the capacitive sensors of the headset to determine whether these are capacitively coupled to the skin of a user wearing the headset, so the processor determines for each capacitive sensor whether it is capacitively coupled to the skin of a user wearing the headset. In a third step 103, the processor sets the headset in the first active mode if the first capacitive sensor, the second capacitive sensor, and the third capacitive sensor are determined to be capacitively coupled to the user wearing the headset. Setting the headset in the first active mode may further comprise setting an audio setting of the headset to a first audio mode.

Figure 3:
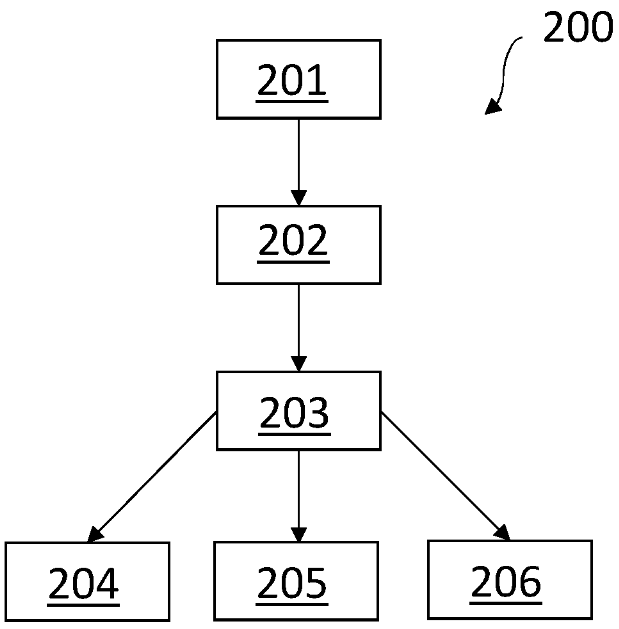

Referring to FIG. 3 showing a flow diagram 200 of what a processor according to an embodiment of the present disclosure is configured to. In a first step 201 the processor receives capacitive information from the first capacitive sensor, the second capacitive sensor, and the third capacitive sensor. In a second step 202 the processor determines whether the headset is in the first active mode. The processor may determine the mode of the headset by retrieving the information from a memory communicatively connected with the processor. In a third step 203 the processor determines which if any of the first capacitive sensor, the second capacitive sensor, and the third capacitive sensor are capacitively coupled to the user wearing the headset based on the received capacitive information. In a fourth step 204 the processor sets the headset in a second active mode, if the first capacitive sensor and the third capacitive sensor are determined to be capacitively coupled to the user wearing the headset and the headset is determined to in the first active mode, or if the second capacitive sensor and the third capacitive sensor are determined to be capacitively coupled to the user wearing the headset and the headset is determined to in the first active mode, set the headset in a second active mode. Setting the headset in the second active mode may further comprise setting an audio setting of the headset to a second audio mode. In a fifth step 205 the processor sets the headset in a first active mode, if the first capacitive sensor, the second capacitive sensor and the third capacitive sensor are determined to be capacitively coupled to the user wearing the headset and the headset is determined to be in the second active mode. Setting the headset in the first active mode may further comprise setting an audio setting of the headset to a first audio mode. In a sixth step 206 the processor sets the headset in a passive mode, if the third capacitive sensor is determined to not be capacitively coupled to the user wearing the headset and the headset is determined to not be in an active mode. The processor may be configured to set the first capacitive sensor, the second capacitive sensor, and the third capacitive sensor to measure as self-capacitance sensors, e.g., as part of the sixth step 206. The processor may be configured to set the first capacitive sensor, the second capacitive sensor, and the third capacitive sensor to measure as mutual capacitance sensors, or set the first capacitive sensor, the second capacitive sensor, and the third capacitive sensor to measure as mutual capacitance sensors and self-capacitance sensors, e.g., as part of the fourth step 204 or the fifth step 205.

The use of the terms "first," "second," "third" and "fourth," "primary," "secondary," "tertiary" etc. does not imply any particular order but are included to identify individual elements. Moreover, the use of the terms "first," "second," "third" and "fourth," "primary," "secondary," "tertiary" etc. does not denote any order or importance, but rather the terms "first," "second," "third" and "fourth," "primary," "secondary," "tertiary" etc. are used to distinguish one element from another. Note that the words "first," "second," "third" and "fourth," "primary," "secondary," "tertiary" etc. are used here and elsewhere for labelling purposes only and are not intended to denote any specific spatial or temporal ordering.

Furthermore, the labelling of a first element does not imply the presence of a second element and vice versa.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the example embodiments may be implemented at least in part by means of both hardware and software, and that several "means", "units" or "devices" may be represented by the same item of hardware.

The various example methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the spirit and scope of the claimed disclosure. The specification and drawings are, accordingly, to be regarded in an illustrative rather than restrictive sense. The claimed disclosure is intended to cover all alternatives, modifications, and equivalents.

The invention claimed is:

1. A headset comprising:

a first earcup comprising:
- a first support structure,
- a first cushion, and
- a first capacitive sensor configured for capacitively coupling to a user wearing the headset, a second earcup comprising:

a second support structure, a second cushion, and a second capacitive sensor configured for capacitively coupling to the user wearing the headset, a headband connecting the first earcup and the second earcup, the headband comprising:

a third capacitive sensor configured for capacitively coupling to the user wearing the headset, a processor communicatively connected to the first capacitive sensor, the second capacitive sensor, and the third capacitive sensor, the processor configured to:

receive capacitive information from the first capacitive sensor, the second capacitive sensor, and the third capacitive sensor, determine for each of the first capacitive sensor, the second capacitive sensor, and the third capacitive sensor, respectively, whether the first capacitive sensor, the second capacitive sensor, and the third capacitive sensor are capacitively coupled to the user wearing the headset based on the received capacitive information, and if the first capacitive sensor, the second capacitive sensor, and the third capacitive sensor are determined to be capacitively coupled to the user wearing the headset, set the headset to a first active mode.

2. The headset according to claim 1, wherein the processor is further configured to:

in response to setting the headset in the first active mode, set the headset in a first audio mode associated with one or more audio settings of the headset.

3. The headset according to claim 1, wherein the processor is further configured to:

determine whether the headset is in the first active mode, set the headset in a second active mode, if the first capacitive sensor and the third capacitive sensor are determined to be capacitively coupled to the user wearing the headset and the headset is determined to be in the first active mode or if the second capacitive sensor and the third capacitive sensor are determined to be capacitively coupled to the user wearing the headset and the headset is determined to be in the first active mode.

4. The headset according to claim 3, wherein the processor is further configured to:

in response to setting the headset in the second active mode, set an audio setting of the headset to a second audio mode.

5. The headset according to claim 1, wherein the processor is further configured to:

determine whether the head is in an active mode, and if the third capacitive sensor is determined to not be capacitively coupled to the user wearing the headset and the headset is determined to be in an active mode, set the headset to a passive mode.

6. The headset according to claim 5, wherein the processor is further configured to:

in response to setting the headset in the passive mode, set an audio setting of the headset to a third audio mode.

7. The headset according to claim 1, wherein the first capacitive sensor, the second capacitive sensor, and the third capacitive sensor each are configured to measure as self-capacitance sensors.

8. The headset according to claim 7, wherein the processor is configured to:

determine whether the headset is in an active mode, and if the headset is determined to not be in an active mode, set the first capacitive sensor, the second capacitive sensor, and the third capacitive sensor to measure as self-capacitance sensors, or if the headset is determined to be in an active mode, set the first capacitive sensor, the second capacitive sensor, and the third capacitive sensor to measure as mutual capacitance sensors, or set the first capacitive sensor, the second capacitive sensor, and the third capacitive sensor to measure as mutual capacitance sensors and self-capacitance sensors.

9. The headset according to claim 1, wherein the first capacitive sensor, the second capacitive sensor, and the third capacitive sensor are each configured to measure as mutual-capacitance sensors, wherein further the first capacitive sensor and the third capacitive sensor are configured to form a first mutual capacitive sensor and the second capacitive sensor and the third capacitive sensor are configured to form a second mutual capacitive sensor.

10. The headset according to claim 9, wherein the processor is further configured to:

determine whether the headset is in an active mode, and if the headset is determined to not be in an active mode, set the first capacitive sensor, the second capacitive sensor, and the third capacitive sensor to measure as self-capacitance sensors, or if the headset is determined to be in an active mode, set the first capacitive sensor, the second capacitive sensor, and the third capacitive sensor to measure as mutual capacitance sensors, or set the first capacitive sensor, the second capacitive sensor, and the third capacitive sensor to measure as mutual capacitance sensors and self-capacitance sensors.

11. The headset according to claim 1, wherein the first earcup comprises a fourth capacitive sensor configured for capacitively coupling to the user wearing the headset, wherein the second earcup comprises a fifth capacitive sensor configured for capacitively coupling to the user wearing the headset, and wherein the processor is communicatively connected to the fourth capacitive sensor and the fifth capacitive sensor, and the processor is further configured to:

receive capacitive information from the first capacitive sensor, the second capacitive sensor, the third capacitive sensor, the fourth capacitive sensor, and the fifth capacitive sensor, determine for each of the first capacitive sensor, the second capacitive sensor, the third capacitive sensor, the fourth capacitive sensor, and the fifth capacitive sensor whether they are capacitively coupled to the user wearing the headset based on the received capacitive information, and if the first capacitive sensor, the second capacitive sensor, the third capacitive sensor, the fourth capacitive sensor, and the fifth capacitive sensor are determined to be capacitively coupled to the user wearing the headset, set the headset to a first active mode.

12. The headset according to claim 11, wherein the first capacitive sensor is separated from the fourth capacitive sensor by a first distance of 1 cm-5 cm, and wherein the second capacitive sensor is separated from the fifth capacitive sensor by a second distance of 1 cm-5 cm.

13. The headset according to claim 12, wherein the first capacitive sensor is separated from the fourth capacitive sensor by a distance of 1 cm-3 cm, and wherein the second capacitive sensor is separated from the fifth capacitive sensor by a second distance of 1 cm-3 cm.

14. The headset according to claim 11, wherein the processor is further configured to:

determine whether the headset is in the first active mode, and set the headset in a second active mode, if the first capacitive sensor, fourth capacitive sensor and the third capacitive sensor are determined to be capacitively coupled to the user wearing the headset and the headset is determined to be in the first active mode or if the second capacitive sensor, the fifth capacitive sensor and the third capacitive sensor are determined to be capacitively coupled to the user wearing the headset and the headset is determined to be in the first active mode.

15. The headset according to claim 1, wherein the third capacitive sensor is embedded in the headband.

* * * * *